US011718412B2

(12) United States Patent
Pitman

(10) Patent No.: US 11,718,412 B2
(45) Date of Patent: Aug. 8, 2023

(54) PROPELLANT-HANDLING MODULE FOR AN AIRCRAFT

(71) Applicant: Brulic Ltd., Hove (GB)

(72) Inventor: James Pitman, London (GB)

(73) Assignee: Brulic Ltd., Hove (GB)

( * ) Notice: Subject to any disclaimer, the term of this patent is extended or adjusted under 35 U.S.C. 154(b) by 189 days.

(21) Appl. No.: 17/279,467

(22) PCT Filed: Sep. 26, 2019

(86) PCT No.: PCT/GB2019/052717
§ 371 (c)(1),
(2) Date: Mar. 24, 2021

(87) PCT Pub. No.: WO2020/065322
PCT Pub. Date: Apr. 2, 2020

(65) Prior Publication Data
US 2021/0362871 A1    Nov. 25, 2021

(30) Foreign Application Priority Data

Sep. 27, 2018  (GB) ...................................... 1815772
Jul. 24, 2019  (GB) ...................................... 1910583

(51) Int. Cl.
*B64D 39/02*    (2006.01)
*H02J 50/10*    (2016.01)
(Continued)

(52) U.S. Cl.
CPC ............. *B64D 39/02* (2013.01); *B64D 39/00* (2013.01); *B64D 39/06* (2013.01);
(Continued)

(58) Field of Classification Search
CPC ......... B64D 39/00; B64D 39/02; B64D 39/06
See application file for complete search history.

(56) References Cited

U.S. PATENT DOCUMENTS 1,806,833 A * 5/1931 Ullendorff ............. B64D 39/00
244/135 A
1,806,834 A    5/1931 Ullendorff
(Continued)

FOREIGN PATENT DOCUMENTS

EP    0472927        3/1992
EP    0472927 A1 *  3/1992  ............. B64D 39/02
(Continued)

OTHER PUBLICATIONS

"Unit Load Devices," Dec. 25, 2017, Qantas (Year: 2017).*
(Continued)

*Primary Examiner* — Joshua J Michener
*Assistant Examiner* — Ryan Andrew Yankey
(74) *Attorney, Agent, or Firm* — Henry Patent Law Firm PLLC

(57) ABSTRACT

A propellant-handling module for installation in a host aircraft comprises: a motorised drum unit comprising a line and drogue for engagement with a propellant supply line of a propellant supply aircraft and for drawing the propellant supply line from the propellant supply aircraft to the host aircraft when the propellant supply aircraft is located behind the host aircraft; a propellant inlet configured for connection with the propellant supply line; a propellant outlet in communication with the propellant inlet and configured for connection with a propellant system of the host aircraft; an electrical power unit for powering the propellant-handling module; and a communication and control system for receiving a deploy command signal and a return command signal from the supply aircraft and configured to: receive said deploy command signal and in response control the motorised drum unit to deploy the line and drogue for said engagement with the propellant supply line; and receive said return command signal and in response control the motor- (Continued)

ised drum unit to return the line and drogue to the host aircraft in said engagement with the propellant supply line for drawing the propellant supply line from the propellant supply aircraft to the host aircraft when the propellant supply aircraft is located behind the host aircraft.

20 Claims, 16 Drawing Sheets

(51) Int. Cl.
*H02J 7/00* (2006.01)
*B64D 39/06* (2006.01)
*B64D 39/00* (2006.01)

(52) U.S. Cl.
CPC ........ *H02J 7/00032* (2020.01); *H02J 7/0045* (2013.01); *H02J 50/10* (2016.02)

(56) References Cited

U.S. PATENT DOCUMENTS

| | | | |
|---|---|---|---|
| 2,023,310 A | 12/1935 | Cobham | |
| 2,123,648 A | 7/1938 | Cobham | |
| 2,193,312 A | 3/1940 | Cobham et al. | |
| 2,261,598 A * | 11/1941 | Virley | B64D 39/00 343/707 |
| 2,769,604 A | 11/1956 | Hudson et al. | |
| 4,126,162 A * | 11/1978 | Clark | B64D 39/06 49/31 |
| 4,905,937 A * | 3/1990 | Spotswood | H01Q 1/42 244/135 A |
| 5,131,438 A | 7/1992 | Loucks | |
| 5,141,178 A * | 8/1992 | Alden | B65H 75/34 244/135 A |
| 7,568,660 B2 * | 8/2009 | Howe | B64D 39/00 60/734 |
| 11,613,377 B2 * | 3/2023 | Pitman | B64D 39/06 244/135 A |
| 2002/0074455 A1 * | 6/2002 | Ollar | B64D 39/02 244/135 A |
| 2004/0065383 A1 * | 4/2004 | Jones | A62B 7/14 141/66 |
| 2007/0181748 A1 * | 8/2007 | Mouskis | B64D 39/02 244/135 A |
| 2009/0184205 A1 | 7/2009 | Matheny | |
| 2010/0276537 A1 | 11/2010 | Kutzmann et al. | |
| 2013/0000927 A1 * | 1/2013 | Meier | A62C 99/009 169/46 |
| 2015/0336677 A1 * | 11/2015 | Smaoui | B64C 39/02 320/109 |
| 2016/0031564 A1 | 2/2016 | Yates | |
| 2016/0195447 A1 * | 7/2016 | Nance | G01G 19/07 701/124 |
| 2017/0275016 A1 * | 9/2017 | Guerquin | B65H 75/4402 |
| 2019/0315479 A1 * | 10/2019 | Tillotson | G01S 5/0072 |

FOREIGN PATENT DOCUMENTS

| | | |
|---|---|---|
| EP | 3680178 | 7/2020 |
| GB | 462818 | 3/1937 |
| GB | 2373488 | 9/2002 |
| WO | 2008045116 | 4/2008 |
| WO | 2020065247 | 4/2020 |
| WO | 2020065271 | 4/2020 |
| WO | 2020065322 | 4/2020 |

OTHER PUBLICATIONS

UKIPO, Search Report dated Sep. 13, 2019, in GB1910583.2, 1 pg.
UKIPO, Search Reporting dated Mar. 15, 2019, in GB1815772.7, 1 pg.
WIPO, International Search Report dated Jan. 17, 2020, in PCT/GB2019/052717, 4 pgs.
USPTO, Non-Final Office Action dated Sep. 27, 2022, in U.S. Appl. No. 16/754,894, 32 pgs.
"Replenishment at Sea", Navy Warfare Publication, U.S. Department of the Navy, Aug. 1996, 440 pgs.
Wikipedia, "Unit load device," dated Sep. 1, 2018, downloaded from https://en.wikipedia.org/w/index.php?title=Unit_load_device&oldid=857525467 on Feb. 27, 2023, 15 pgs.

* cited by examiner

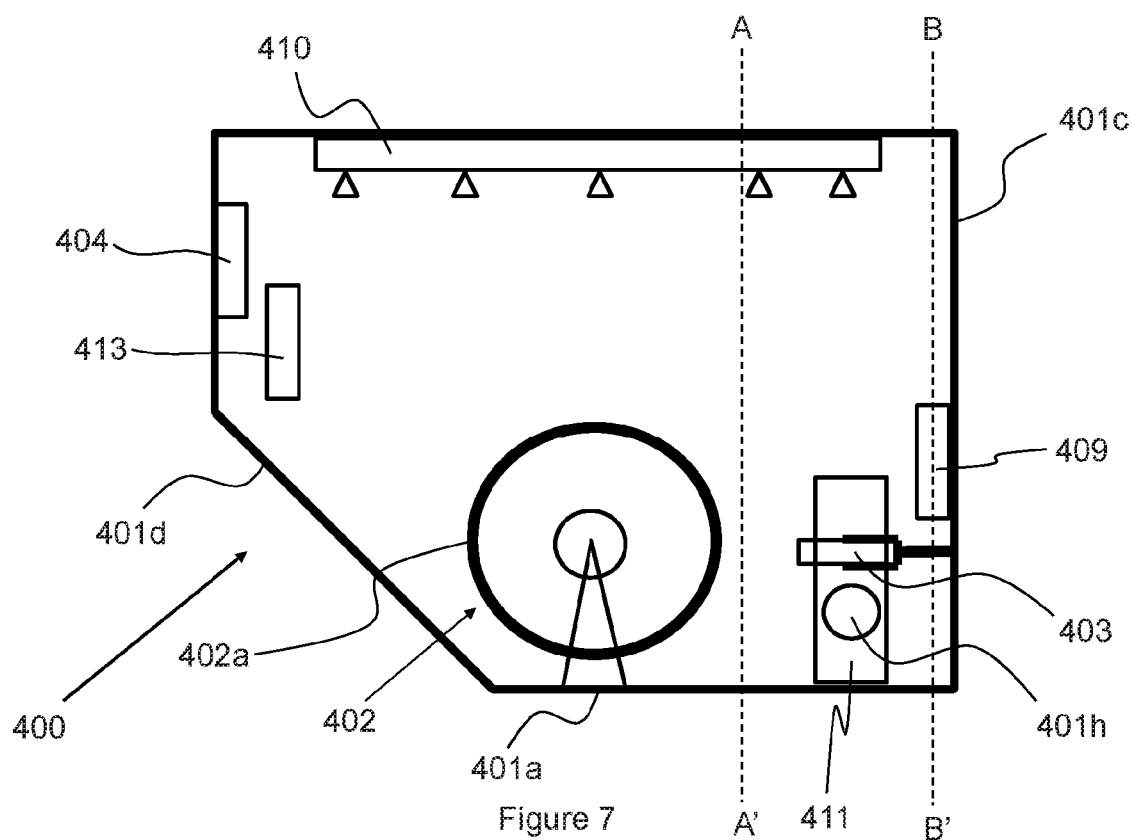

PROPELLANT-HANDLING MODULE FOR AN AIRCRAFT

This application is a 371 national stage entry of International Application No. PCT/GB2019/052717, filed Sep. 26, 2019, and entitled "Propellant-Handling Module for an Aircraft," which claims priority to GB1910583.2 filed Jul. 24, 2019, and GB1815772.7 filed Sep. 27, 2018, the contents of which are hereby incorporated by reference herein in their entirety.

BACKGROUND OF THE INVENTION

The present invention relates to a propellant-handling module for installation in an aircraft.

In-flight refuelling (IFR) involves the transfer of fuel from one aircraft (the "tanker") to another aircraft (the "receiver") during flight. IFR (also known as aerial refuelling or air-to-air refuelling) has become a well-established methodology used to extend the range or loiter time (or increase take-off payload) of military aircraft. Typically the tanker is based on an airliner which has been specially redesigned or converted for refuelling operations, while the receiver is usually a military aircraft such as a fighter or transport aircraft.

Since the 1950s IFR has become well-established for military aircraft and today there are two different methods in widespread use: flying boom and probe-and-drogue. In each of these methods the two aircraft fly in formation, with the receiver located behind the tanker so that it can receive a fuel hose or boom which is deployed from the tanker.

While IFR has become routine for military aircraft, it has not been applied to any significant extent to large civil aircraft in commercial airline operations, despite huge potential benefits in terms of cost-savings due to reduced fuel consumption. The main reason is the high level of skill needed by the pilot of the receiver aircraft to safely control the receiver in close formation with the tanker during the hazardous fuelling operation. This requires specialized and regular training which is not practical for commercial airline crews.

Recently, however, the applicant has proposed new IFR methods which enable in-flight (re)fuelling of large civil aircraft, as well as military aircraft. In these methods, the tanker aircraft and the receiver aircraft fly in formation, with the tanker located behind the receiver. A line and drogue is deployed rearwardly from the receiver and the drogue is engaged with an end of a fuel hose of the tanker. The line and drogue are then retracted, so as to return to the receiver along with the end of the fuel hose. The end of the fuel hose is connected to the fuel system of the receiver and fuel is transferred from the tanker to the receiver. The deployment of the line and drogue from the receiver, engagement of the fuel hose with the drogue, and attachment of the fuel hose to the fuel system of the receiver, are all controlled by the crew of the tanker aircraft who possess the specialist skills needed for these operations. There is therefore no requirement for the commercial crew of the receiver aircraft to be specially trained, either in terms of flying in formation or in handling the fuelling system.

The present invention provides propellant-handling apparatus suitable for carrying out the above-described new methods of in-flight (re)fuelling, including electrical (re)charging.

SUMMARY OF THE INVENTION

According to an aspect of the invention, there is provided a propellant-handling module for installation in a host aircraft, comprising: a motorised drum unit comprising a line and drogue for engagement with a propellant supply line of a propellant supply aircraft and for drawing the propellant supply line from the propellant supply aircraft to the host aircraft when the propellant supply aircraft is located behind the host aircraft; a propellant inlet configured for connection with the propellant supply line; a propellant outlet in communication with the propellant inlet and configured for connection with a propellant system of the host aircraft; an electrical power unit for powering the propellant-handling module; and a communication and control system for receiving a deploy command signal and a return command signal from the supply aircraft and configured to: receive said deploy command signal and in response control the motorised drum unit to deploy the line and drogue for said engagement with the propellant supply line; and receive said return command signal and in response control the motorised drum unit to return the line and drogue to the host aircraft in said engagement with the propellant supply line for drawing the propellant supply line from the propellant supply aircraft to the host aircraft when the propellant supply aircraft is located behind the host aircraft.

As used herein, "propellant" means any energy source suitable for use in a propulsion system of an aircraft for powered flight. Examples include, but are not limited to, liquid or gaseous fuels (including jet fuel/kerosene, aviation gasoline, hydrogen, natural gas, and the like), and electrical energy.

The claimed invention advantageously provides all of the components, needed by a receiver aircraft for in-flight (re)fuelling, in a module which can be conveniently installed in a range of aircraft types and models, including by retrofit. Furthermore the components of the module for the receiver aircraft do not include the propellant supply line. Rather, the propellant supply line is provided by the supply aircraft, while the module for the receiver aircraft includes the motorised drum unit, comprising a line and drogue, for drawing (an end of) the propellant supply line away from the supply aircraft to the receiver aircraft. There is therefore no need for the receiver aircraft to carry a propellant supply line. This advantageously reduces costs for the operator of the receiver aircraft (especially across a large fleet of receiver aircraft), and avoids safety and certification issues relating to the hazardous propellant supply line (e.g. fuel hose or electrical cable) for the receiver aircraft.

The module can be pre-installed, pre-tested, and connected in a physical unit that can fit into the vast majority of large, civil aircraft. This modular approach is far more cost-effective than integrating the individual components into different aircraft types in a bespoke manner. In this way, large fleets of commercial aircraft can be rapidly and cost-effectively equipped for in-flight (re)fuelling. Furthermore, by standardising the equipment, its arrangement, its interoperability and its functions, into a standard unit, safety certification will be facilitated.

The communication and control system may comprise an integral communication unit configured to receive the command signals sent by the supply aircraft.

The communication and control system may comprise a communication interface configured for connection with a remote communication unit which is located on-board the host aircraft externally of the propellant-handling module and which is configured to receive the command signals sent by the supply aircraft.

The communication and control system may comprise an integral control unit configured for said control of the motorised drum unit.

The communication and control system may comprise a control interface configured for connection with a remote control unit which is located onboard the host aircraft externally of the propellant-handling module and which is configured for said control of the motorised drum unit.

The electrical power unit may comprise an integral electrical power source.

The electrical power unit may comprise an electrical power interface configured for connection with an external electrical power source of the host aircraft.

The communication and control system may comprise a communication interface configured for connection with a flight management system of the host aircraft.

The propellant-handling module may comprise a housing which contains the motorised drum unit, the propellant inlet, the propellant outlet, the electrical power unit, and optionally the communication and control system. The housing may comprise a main part and an extension part, the extension part being for providing a connecting passageway between the propellant-handling module and an exterior surface of the host aircraft when the propellant-handling module is installed in the host aircraft. The main part of the housing may have the size and shape of a standard aircraft unit load device (ULD). The main part of the housing may have: height of 1626 mm, depth of 1534 mm, base width of 1562 mm, total width of 2337 mm, and internal volume of 5.0 m$^3$; or height of 1626 mm, depth of 1534 mm, base width of 1194 mm, total width of 1562 mm, and internal volume of 3.5 m$^3$; or height of 1626 mm, depth of 1534 mm, base width of 1562 mm, total width of 2007 mm, and internal volume of 4.5 m$^3$; or height of 1143 mm, depth of 1534 mm, base width of 1562 mm, total width of 2438 mm, and internal volume of 3.7 m$^3$.

The vast majority of commercial aircraft in operation today carry freight in standard sized unit load devices, which are configured to fit in the cargo compartments of the aircraft. Providing the components in a housing having the size and shape of a ULD makes retrofitting of the propellant-handling module even more straightforward. Preferably, the housing is positioned in the receiver aircraft exactly from where the cable and drogue are to be deployed in the underside aft position of the aircraft in use.

The propellant may be a liquid fuel and the propellant supply line may be a fuel hose of the supply aircraft, so that: the propellant inlet comprises a fuel inlet port configured for connection with the fuel hose; and the propellant outlet comprises a fuel outlet port in fluidic communication with the fuel inlet port and configured for connection with a fuel system of the host aircraft.

The propellant-handling module may comprise at least one fuel pump configured to pump fuel from the fuel inlet port to the fuel outlet port.

The propellant-handling module may comprise an inerting system including a supply of inert gas for venting fuel vapour from the propellant-handling module. When the propellant-handling module is installed in the host aircraft, the inert gas system can be used to vent fuel vapour from the module, from the fuel hose and/or from the receiver aircraft fuel lines which extend from the fuel outlet port to the fuel tanks of the receiver aircraft.

The propellant may be electrical energy and the propellant supply line may be an electrical cable of the supply aircraft, so that: the propellant inlet comprises an electrical inlet connection configured for direct or inductive coupling with the electrical cable; and the propellant outlet comprises an electrical outlet socket in electrical communication with the electrical inlet connection and configured for connection with an electrical system of the host aircraft. The electrical inlet connection may comprise an electrical inlet socket for direct coupling with the electrical cable. The electrical inlet connection may comprise an inductive coil for inductive coupling with an inductive coil of the electrical cable.

The propellant-handling module may comprise a measuring device configured to measure the propellant transferred between the propellant inlet and the propellant outlet.

The propellant-handling module may comprise a fire suppression system including a supply of fire suppressant chemicals for, when the propellant-handling module is installed in the host aircraft, suppressing a fire in the propellant-handling module.

The propellant-handling module may comprise a cutter for, when the propellant-handling module is installed in the host aircraft, severing the propellant supply line so as to separate the propellant supply line from the propellant-handling module.

The propellant inlet may comprise an electromagnetic device controllable by the communication and control system to provide an attractive magnetic force for guiding the propellant supply line to the propellant inlet.

According to another aspect of the invention, there is provided an aircraft comprising a propellant-handling module as described herein above. The propellant-handling module may be retrofitted to the aircraft.

BRIEF DESCRIPTION OF THE DRAWINGS

Embodiments will now be described, by way of example, with reference to the accompanying figures in which:

FIGS. 7 to 9 show an electrical charging module according to a second example of the invention.

FIG. 1 shows a fuel receiver aircraft 100, which is a commercial airliner. The receiver aircraft 100 comprises a propellant-handling module, in this example a fuelling module 200. As will be described in detail herein, in this example the fuelling module 200 is for receiving liquid fuel from a separate supply aircraft and delivering the fuel to the fuel system of the receiver aircraft 100, for the ultimate purpose of powering the receiver aircraft in flight.

Referring now to FIG. 2, in this example the fuelling module 200 comprises a housing 201. Also in this example, the housing 201 is constructed from fire resistant materials, as discussed later herein. Also in this example, the housing 201 has the size and general shape of a standard cargo unit load device (ULD), so as to fit conveniently into the rear cargo bay of the receiver aircraft 100. Thus the housing 201 comprises a base 201a, a top 201b, a first end 201c, a second end 201d, a first side 201e, and a second side 201f. In this example, the housing 201 has a total width 201wt of 2337 mm, a base width 201wb of 1562 mm, a depth 201dp of 1534 mm, a height 201ht of 1626 mm, and an internal volume of 5.0 m$^3$. Also in this example, the housing 201 further comprises an extension tunnel 201g which projects from the first side 201e of the housing 201.

The fuelling module 200 comprises various components which are disposed in the housing 201. FIG. 3 shows a view of the components inside the housing 201, in a direction facing the first side 201e of the housing 201. FIG. 4 shows a view of some of the components, in a direction facing the first end 201c of the housing 201 and taken from the plane of line A-A' of FIG. 3. FIG. 5 shows a view of some of the components, in a direction facing the first end 201c of the housing 201 and taken from the plane of line B-B' of FIG. 3. The components of the fuelling module 200 will now be described.

Figure 1:
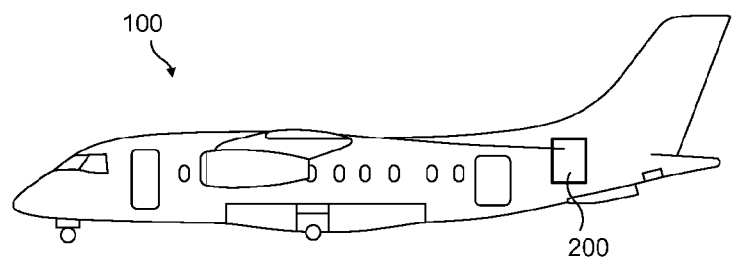
FIG. 1 shows an aircraft comprising a fuelling module according to a first example of the invention.
Figure 2:
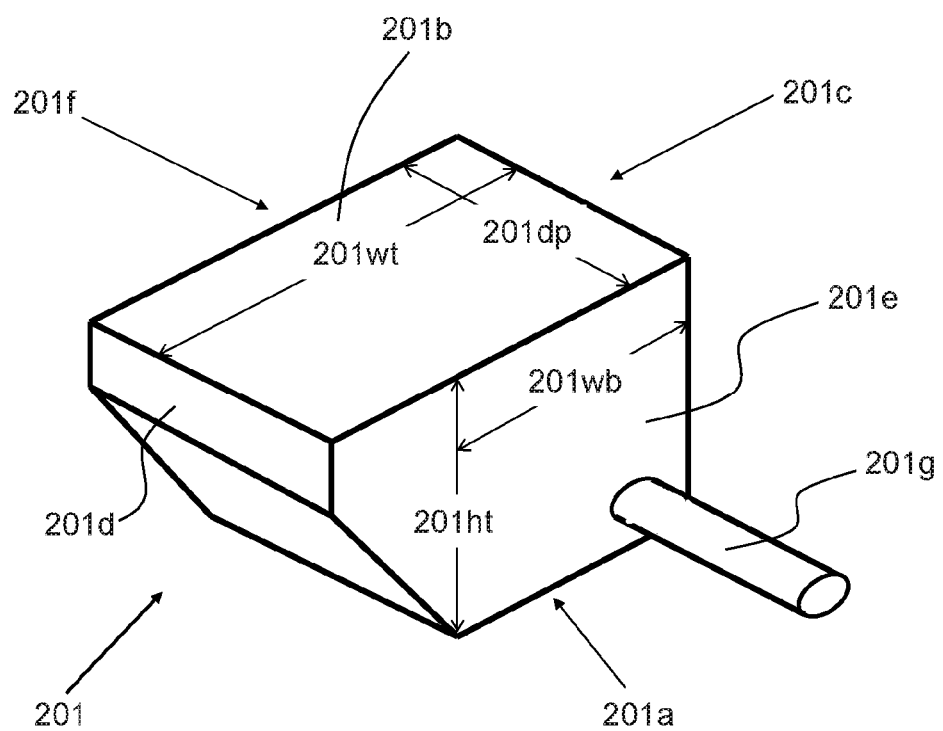
FIG. 2 shows a housing of the fuelling module.
Figure 3:
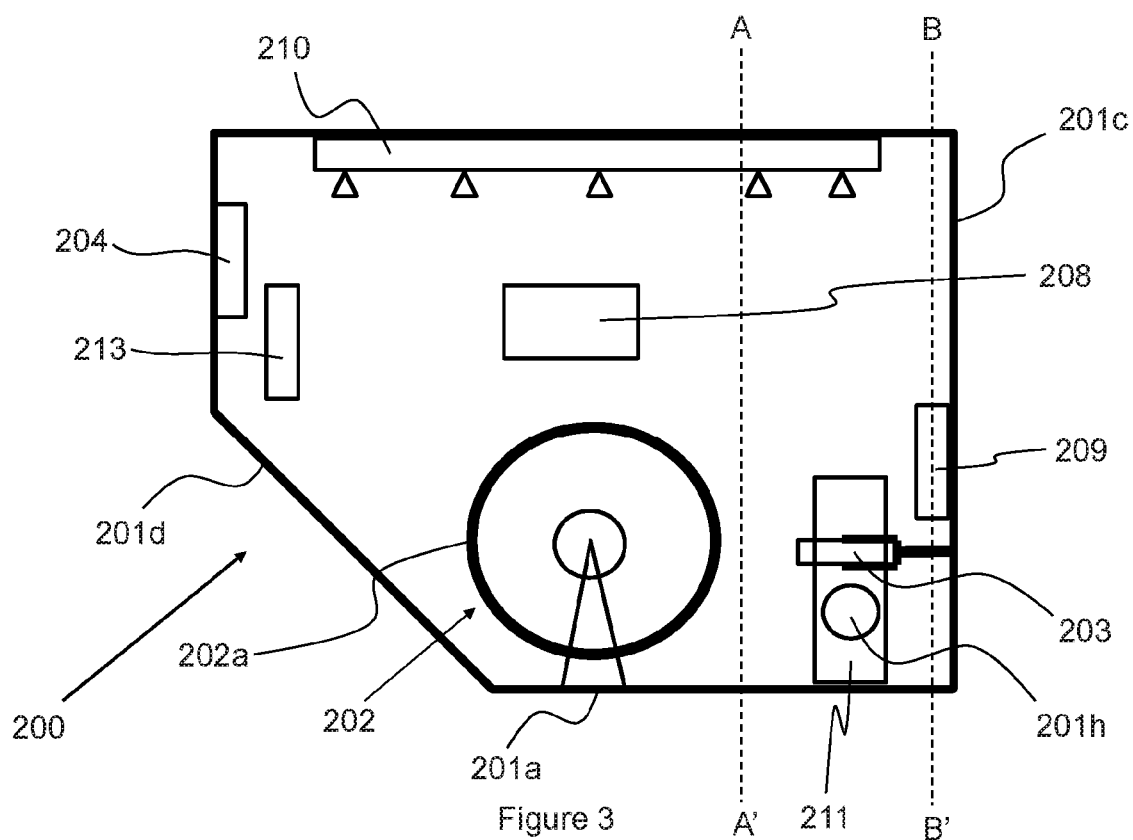
FIGS. 3 to 5 show components of the fuelling module arranged in the housing.
Figure 4:
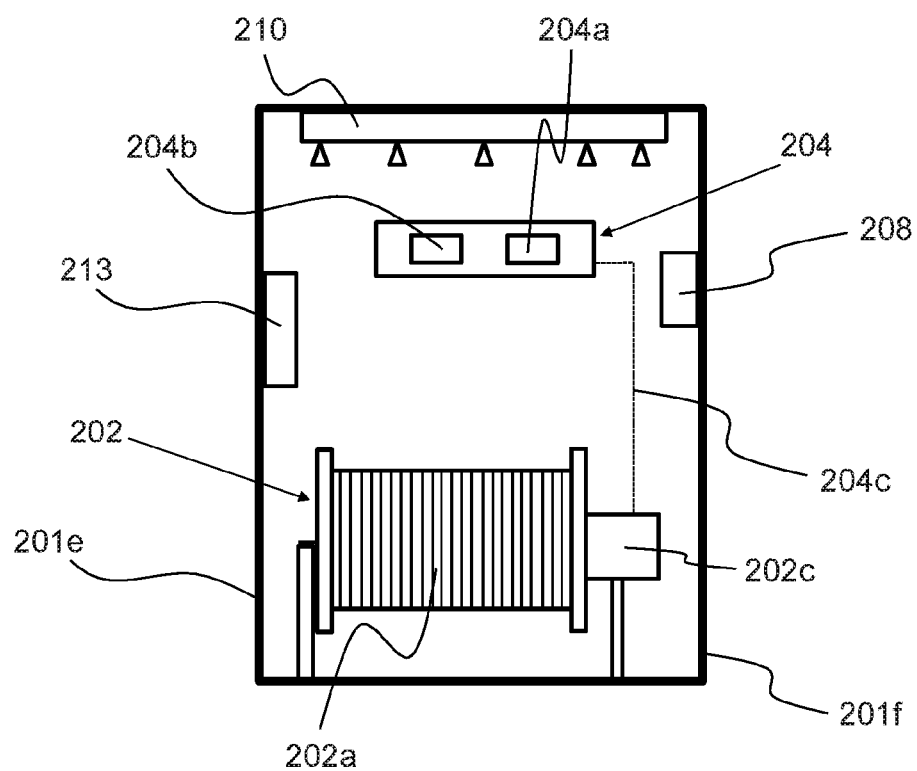

Referring in particular to FIGS. 3 and 4, a motorised cable drum unit 202 comprises a drum supported by a frame which extends from the base 201a (or floor) of the housing 201. In this example, the drum is a multi-speed, geared drum. The cable drum unit 202 comprises a cable 202a which is wound around the drum, one end of the cable 202a being fixedly attached to the drum. In this example the cable 202a is constructed from steel. Alternatively the cable 202a may be constructed from some other material having high tensile strength and flexibility, e.g. carbon fibre composite. The other end (or free end) of the cable 202a is fixedly attached to a drogue 202b (not shown in the Figures). The cable drum unit 202 comprises a motor 202c which is operable to rotate the drum, so as to extend and retract the cable 202a and thereby the drogue 202b.

Figure 5:
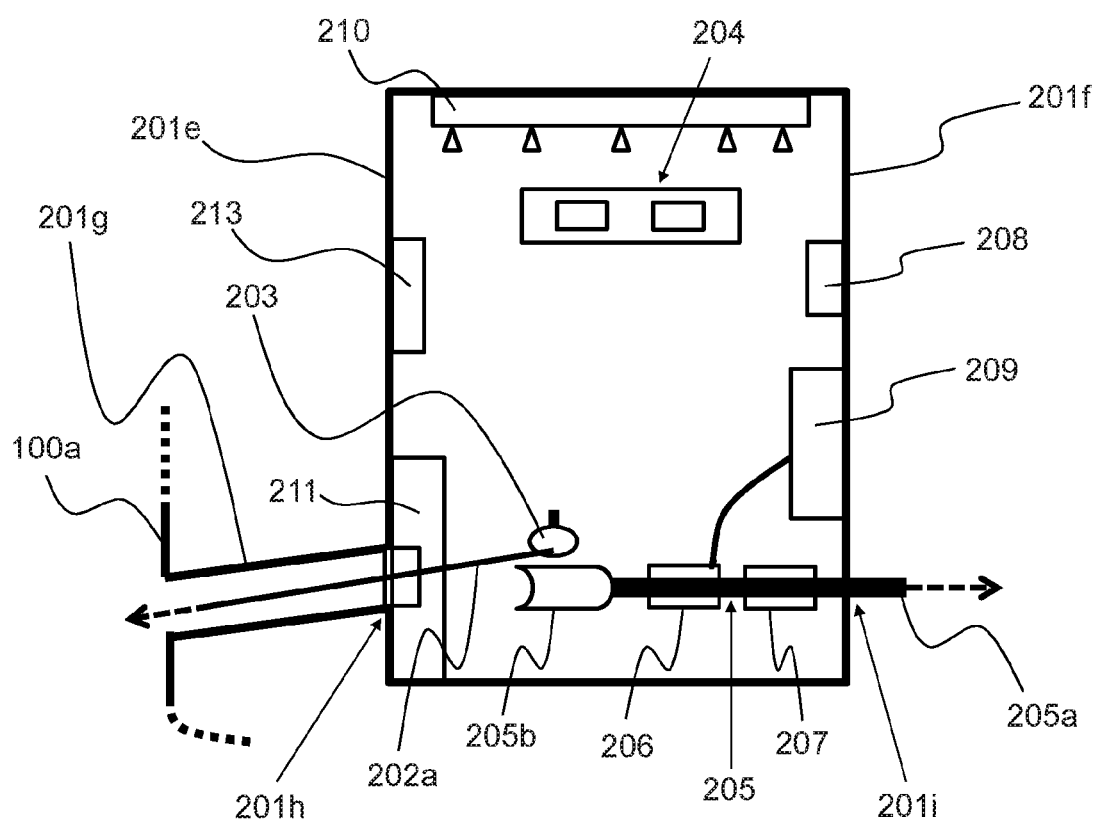

Referring now also to FIG. 5, a pulley 203 is supported at the first end 201c of the housing 201, and is arranged for turning the direction of the extended cable 202a through 90 degrees toward an aperture 201h which is provided in the first side 201e of the housing 201, as will be described later herein. The extension tunnel 201g extends outwardly from the aperture 201h, the distal end of the extension tunnel 201g comprising a rim which is located in an opening in the fuselage 100a of the receiver aircraft 100.

Still referring to FIGS. 3 to 5, a communication and control system 204 is located at the second end 201d of the housing 201. In this example, the communication and control system 204 comprises a communication unit 204a (including an antenna, not shown in the Figures) and a control unit 204b. The communication unit 204a is configured to receive signals from a fuel supply aircraft, or tanker aircraft. The control unit 204b is connected to the motor 202c of the cable drum unit 202 via a control link 204c (which may be a wired, or a wireless, connection) and is configured to operably control the cable drum unit 202, and thereby the cable 202a and the drogue 202b, as will be described later herein.

Referring now in particular to FIG. 5, a fuel pipe 205 is supported by a frame (not shown in the Figures) which extends from the base 201a (or floor) of the housing 201. A portion of the fuel pipe 205 extends out of the housing 201, through an aperture 201i which is provided in the second side 201f of the housing 201, and comprises a fuel outlet port 205a which is configured to connect to fuel lines of the fuel system (not shown in the Figures) of the receiver aircraft 100. The fuel outlet port 205a comprises a valve (not shown in the Figures) which can be controlled to be opened and closed to control the flow of fuel out of the fuel pipe 205 toward the fuel system of the receiver aircraft 100. At the other end of the fuel pipe 205 there is provided a fuel inlet port 205b which is located inside the housing 201 and is configured to connect to a fuel probe of a fuel hose of the tanker aircraft, as will be described later herein. The fuel inlet port 205b comprises a valve (not shown in the Figures) which can be controlled to be opened and closed to control the flow of fuel into the fuel pipe 205 from the fuel probe. Thus the fuel outlet port 205a and the fuel inlet port 205b are in fluidic communication via the fuel pipe 205 which extends between the two ports.

In this example, located between the fuel inlet port 205b and the fuel outlet port 205a, and in fluidic communication with the fuel pipe 205, there is provided a fuel pump 206, for pumping fuel from the tanker aircraft to the receiver aircraft 100, and a turbine flow meter 207, for determining the amount of fuel being transferred between the two aircraft. In this example there is provided (not shown in the Figures) a data storage device, for storing data relating to the amount of fuel, and a GSM remote interrogation system, for accessing the data.

Also in this example, the fuelling module 200 comprises a fuel vapour detection system 208 which is configured to determine the level of fuel vapour inside the housing 201.

Further in this example, there is provided an inert gas venting system 209, including a supply of inert gas which is connected to the fuel pipe 205, for venting fuel vapour therein to the fuel hose and/or from the receiver aircraft fuel lines which extend from the fuel outlet port 205a to the fuel tanks of the receiver aircraft. The inert gas venting system 209 may be activated when a fuel vapour concentration, as determined by fuel vapour detection system 208, exceeds some predetermined threshold value.

Still further in this example, the fuelling module 200 comprises a fire suppression system 210, including a reservoir of fire suppressant chemicals and an array of dispensing nozzles, for suppressing or extinguishing a fire in the housing 201.

Yet further in this example, there is provided a guillotine system 211 for rapidly severing the fuel hose of the tanker aircraft, in order to separate the fuel hose from the fuelling module 200 to allow separation of the tanker and receiver aircraft 100 in an emergency situation.

The fuelling module 200 also includes an electrical power unit 213 for powering the various components of the module. In this example, the electrical power unit 213 comprises an electrical interface for receiving electrical power from the receiver aircraft 100.

The operation of the fuelling module 200 will now be described with reference to FIGS. 6a-h.

Figure 6A:
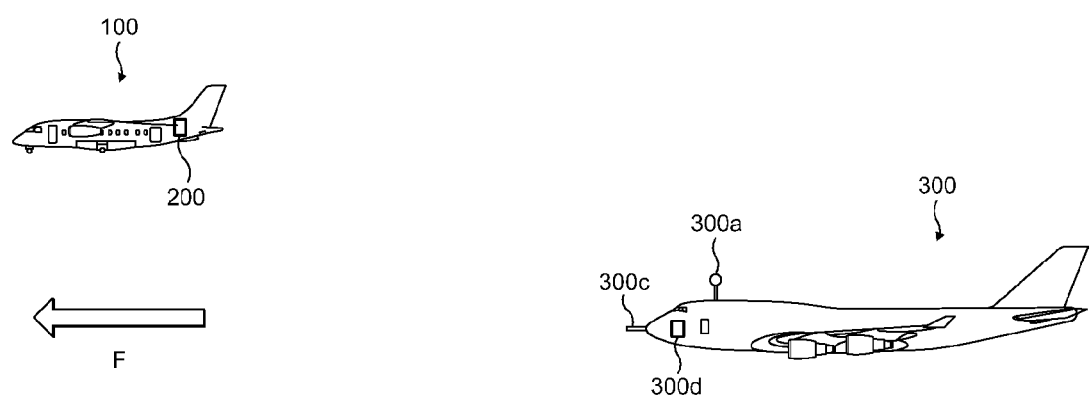
FIGS. 6a to 6h illustrate an inflight (re)fuelling operation using the fuelling module.

In FIG. 6a, the receiver aircraft 100 is flying straight and level in a forward direction F at a constant speed. In other words, the receiver aircraft 100 is being flown at a steady cruise. A fuel tanker aircraft 300 is flying behind the receiver aircraft 100. The tanker aircraft 300 comprises a communication unit (e.g. including an antenna) 300a. The tanker aircraft 300 further comprises a hose drum unit (not shown in the Figures) which is located in the nose section of the aircraft 300. The hose drum unit houses a fuel hose 300b (not shown in FIG. 6a) which is wound around the drum, one end of the fuel hose 300b being fixedly attached to the drum. The fuel hose 300b is constructed from rubber materials. The other end of the fuel hose 300b is fixedly attached to the rearward end of an elongate fuel probe 300c. The fuel probe 300c projects forwardly from the nose of the tanker aircraft 300 and is configured to be detachable therefrom. The fuel probe 300c is constructed from titanium alloy. The tanker aircraft 300 further comprises a control unit 300d which is configured to operably control the hose drum unit and thereby the fuel hose 300b. The tanker aircraft 300 further comprises fuel storage tanks containing fuel, and a fuel pump for pumping the stored fuel through the fuel hose 300b (none of these elements being shown in the Figures).

The tanker aircraft 300 is flying straight and level in the forward direction F at a constant speed. The forward speed of the tanker aircraft 300 is being controlled to be substantially the same as the forward speed of the receiver aircraft 100. Furthermore the tanker aircraft 300 is being controlled to remain at a constant lateral- and height-separation from the receiver aircraft 100. That is, the tanker aircraft 300 is being controlled to remain in a fixed position relative to the receiver aircraft 100. Thus the tanker aircraft 300 and the receiver aircraft 100 are flying in formation with each other. With the flight formation established, an inflight (re)fuelling operation is carried out, as follows.

Figure 6B:
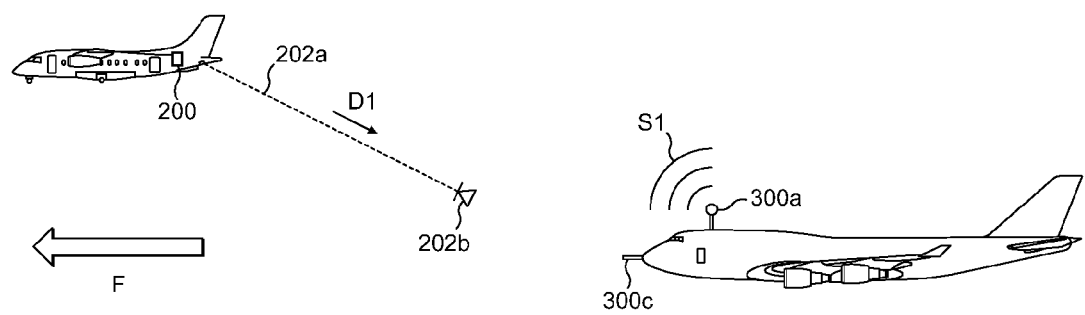

Turning to FIG. 6b, a first command signal S1 is sent by the communication unit 300a of the tanker aircraft 300. The first command signal S1 is received by the communication unit 204a of the fuelling module 200 (on-board the receiver aircraft 100) and is processed by the control unit 204b thereof. In response to the first command signal S1 the control unit 204b controls the cable drum unit 202, via the control link 204c, to deploy the cable 202a and drogue 202b from the receiver aircraft 100. The cable 202a and drogue 202b are directed by the pulley 203 into the aperture 201h. As the cable 202a continues to be unwound from the drum the cable and drogue 202b pass through the extension tunnel 201g and out of the opening in the fuselage 100a of the receiver aircraft 100. Thus the cable 202a and drogue 202b are deployed rearwardly of the receiver aircraft 100 in a first direction D1. In this example the cable 202a is unwound slowly from the drum in low gear initially, as the drogue 202b emerges from the receiver aircraft 100, then more quickly in high gear as the drogue 202b moves further away from the receiver aircraft 100. Low gear is then used again for fine control as the drogue 202b approaches the tanker aircraft 300. During deployment of the cable 202a and drogue 202b the receiver aircraft 100 and the tanker aircraft 300 remain in formation at constant speed in straight and level flight in the forward direction F.

Figure 6C:
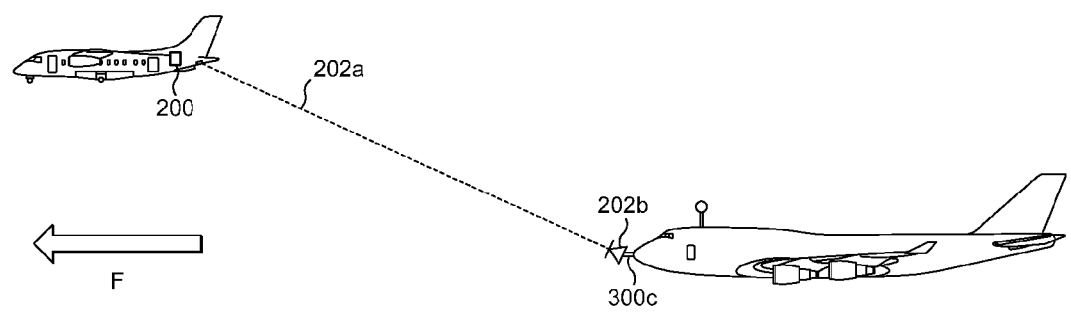

Referring next to FIG. 6c, the cable 202a is extended sufficiently so that the drogue 202b is close to the nose of the tanker aircraft 300 and the fuel probe 300c which extends therefrom. The tanker aircraft 300 is flown (e.g. accelerated) toward the drogue 202b in order for the fuel probe 300c to engage the drogue 202b, and/or the tanker crew manoeuvres the drogue 202b via control signals to adjustable aerodynamic control surfaces of the drogue 202b. Specifically the tanker aircraft 300 is manoeuvred so that the fuel probe 300c enters the rearward end of the funnel-shaped drogue 202b and is passed through a central aperture of the drogue 202b so as to project outwardly from the forward end of the drogue 202b. Once the drogue 202b is positioned over the fuel probe 300c in this way the drogue 202b is fixedly coupled to the fuel probe 300c. The coupling is by means of self-actuating mechanical clamps or electromagnetic devices, which are comprised by one or both of the drogue 202b and the fuel probe 300c and are activated to close by the forward passage of the fuel probe 300c through the drogue 202b, or by control signals from the tanker aircraft 300.

In this coupled condition the tanker aircraft 300 is tethered to the receiver aircraft 100 by the cable 202a and drogue 202b. The tanker aircraft 300 is again controlled to remain in a fixed position (i.e. with regard to lateral- and height-separation) relative to the receiver aircraft 100, such that the two aircraft are flying in formation with each other. The control unit 204b of the fuelling module 200 is operable to control the drum of the cable drum unit 202 in order to maintain tension in the cable 202a, so as to mitigate any turbulence which might cause the receiver aircraft 100 and the tanker aircraft 300 to move relative to each other momentarily.

Figure 6D:
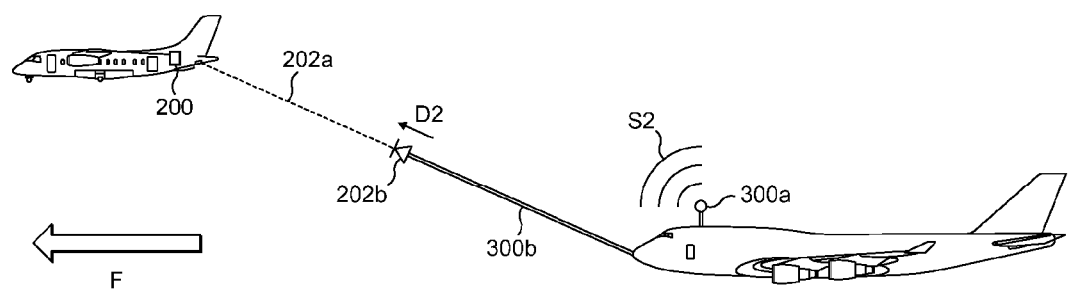

Referring now to FIG. 6d, a second command signal S2 is sent by the communication unit 300a of the tanker aircraft 300. The second command signal S2 is received by the communication unit 204a of the fuelling module 200 and is processed by the control unit 204b thereof. In response to the second command signal S2 the control unit 204b controls (i.e. reverses) the cable drum unit 202, via the control link 204c, to retract the cable 202a and drogue 202b back toward the receiver aircraft 100, in a second direction D2 which is opposite to the first direction D1.

The tensile (pulling) force on the cable 202a causes the fuel probe 300c (which is coupled to the drogue 202b) to detach from the nose of the tanker aircraft 300.

The fuel hose 300b, which is attached to the rearward end of the fuel probe 300c, is thus drawn away from the nose of the tanker aircraft 300. That is, the fuel hose 300b is moved (extended) relative to the tanker aircraft 300. As the cable 202a is wound on the drum of the cable drum unit 202 of the fuelling module 200, the fuel hose 300b is expelled from the hose drum unit of the tanker aircraft 300. In this example the control unit 300d of the tanker aircraft 300 controls the hose drum unit to assist in the deployment of the fuel hose 300b. Therefore in this example the fuel hose 300b is extended (or expelled) out of the nose of the tanker aircraft 300 and the cable 202a is retracted by the simultaneous actions of the hose drum unit of the tanker aircraft 300 and the cable drum unit 202 of the fuelling module 200 on-board the receiver aircraft 100. Alternatively the hose drum unit may be allowed to "freewheel" so that the fuel hose 300b is extended by just the action of the cable drum unit 202.

Thus the cable 202a, drogue 202b, fuel probe 300c and fuel hose 300b are drawn away from the tanker aircraft 300 toward the receiver aircraft 100. During this operation the receiver aircraft 100 and the tanker aircraft 300 remain in formation.

Figure 6E:
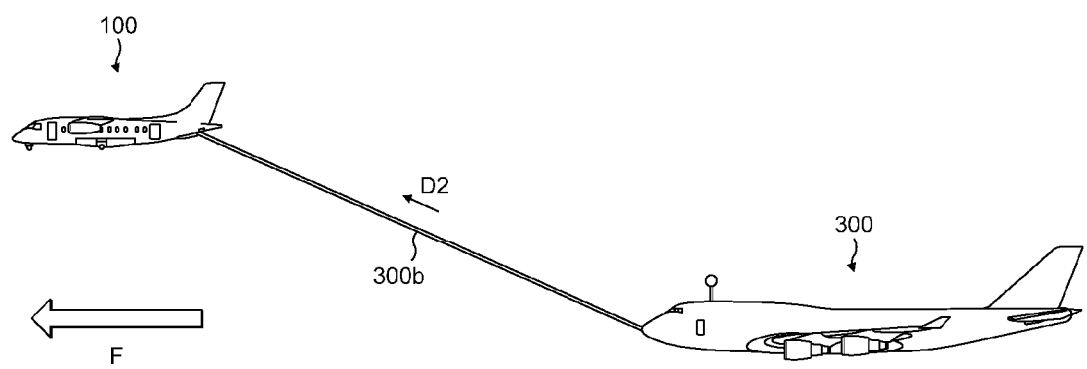

When the drogue 202a and fuel probe 300c reach the receiver aircraft 100, the low gear of the cable drum unit 202 is applied and the fuel probe 300c is guided through the extension tunnel 201g to the fuel inlet port 205b inside the housing 201 of the fuelling module 200. In this example, the fuel inlet port 205b comprises an electromagnetic device (not shown in the Figures) which is operable by the control unit 204b to produce a magnetic attraction force for guiding the fuel probe 300c into the fuel inlet port 205b. The fuel inlet port 205b receives the forward end of the fuel probe 300c, which projects forwardly of the drogue 202b as described above. In this condition the fuel hose 300b is extended the full distance between the tanker aircraft 300 and the receiver aircraft 100, as shown in FIG. 6e. The two aircraft 100, 300 remain in formation. In addition to the magnetic attraction between the fuel probe 300c and the fuel inlet port 205b, a tensile (pulling) force, exerted on the cable 202a (and thereby on the drogue 202b) by the cable drum unit 202 of the fuelling module 200, holds the forward end of the fuel probe 300c securely in the inlet port 205b to facilitate fuel transfer with no leakage. If very high pressure fuel transfer is required then a latch mechanism may be provided to positively lock the fuel probe 300c to the fuel inlet port 205b.

The fuel pump of the tanker aircraft 300 (and optionally the fuel pump 206 of the fuelling module 200) is activated, to transfer fuel from the fuel storage tanks of the tanker aircraft 300 to the fuel tanks of the receiver aircraft 100 (i.e. in direction D2). The fuel transfer is controlled by the crew of the tanker aircraft 300. This control, including the activation of the fuel inlet and outlet port valves (and optionally the fuel pump 206) of the fuelling module 200 and also the level of tension applied to the fuel hose 300b by the cable drum unit 202, is via signals which are sent by the communication unit 300a of the tanker aircraft 300 to the communication unit 204a of the fuelling module 200 and processed by the control unit 204b of the fuelling module 200. Preferably the communication unit 300a of the tanker aircraft 300 and the communication unit 204a of the fuelling module 200 are configured for two-way communication for exchange of data.

The amount of fuel being transferred to the receiver aircraft 100 is monitored (and optionally recorded) by the crew of the tanker aircraft 300 using the turbine flow meter 207, data storage device, and GSM remote interrogation system. The crew of the receiver aircraft 100 may advise the crew of the tanker aircraft 300 of the total amount of fuel required, for example by radio communication. Alternatively the crew of the tanker aircraft 300 may be advised by a third party, for example an operator at a base of the airline which owns the receiver aircraft 100, of the total amount of fuel to be transferred. The total amount of fuel to be transferred may be predetermined. The transfer of fuel may be controlled remotely.

When the required amount of fuel has been transferred the fuel pump of the tanker aircraft 300 is deactivated (along with the fuel pump 206 of the fuelling module 200, if being used) so that fuel flow through the fuel hose 300b ceases. The fuel hose 300b may be vented, using the inert gas venting system 209, to displace any residual fuel from the fuel hose 300b to the fuel tanks of the receiver aircraft 100.

Figure 6F:
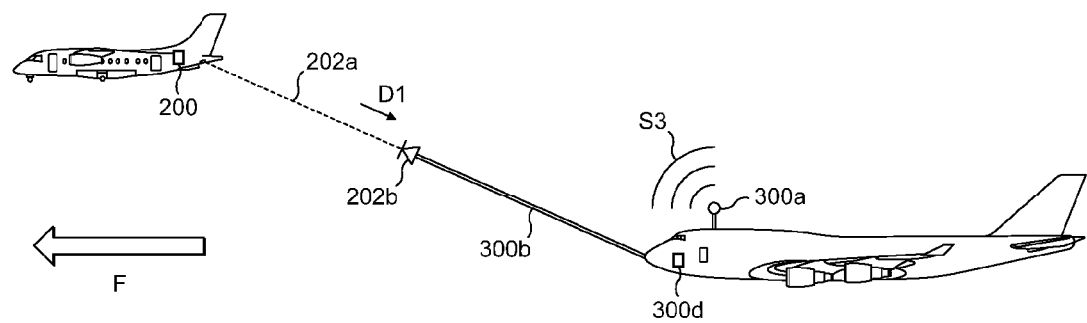

Referring next to FIG. 6f, a third command signal S3 is sent by the communication unit 300a of the tanker aircraft 300. The third command signal S3 is received by the communication unit 204a of the fuelling module 200 and is processed by the control unit 204b thereof. In response to the third command signal S3, the control unit 204b unlocks the latch mechanism (if used) and deactivates the electromagnetic device (e.g. by reversal of polarity), so as to disengage the fuel probe 300c from the fuel inlet port 205b. The control unit 204b further controls the cable drum unit 202, via the control link 204c, to deploy the cable 202a and drogue 202b, and thereby the fuel probe 300c which is still coupled to the drogue 202b. Furthermore the control unit 300a of the tanker aircraft 300 controls the hose drum unit to retract the fuel hose 300b. Therefore the cable 202a is extended and the fuel hose is 300b is retracted by the simultaneous actions of the cable drum unit 202 of the fuelling module 200 and the hose drum unit of the tanker aircraft 300. Thus the cable 202a and drogue 202b, fuel probe 300c and fuel hose 300b are moved in the first direction D1 toward the tanker aircraft 300. Alternatively the cable drum unit 202 may be allowed to "freewheel" so that the cable 202a is extended by just the action of the hose drum unit. During this operation the receiver aircraft 100 and the tanker aircraft 300 remain in formation.

Figure 6G:
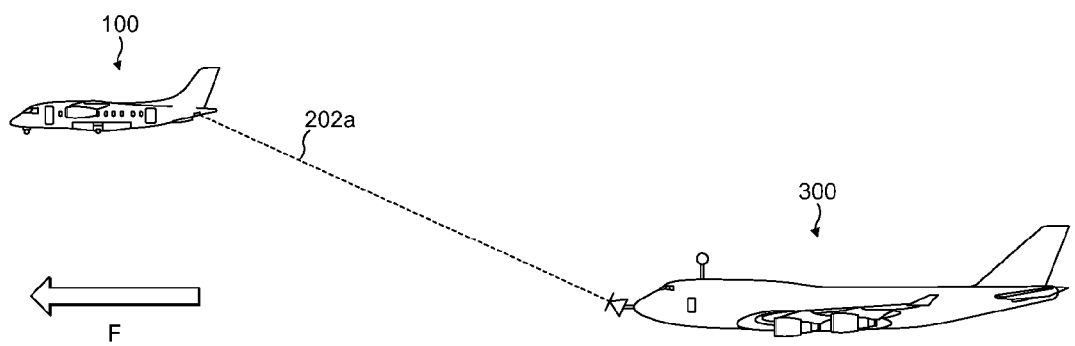

When the drogue 202b and fuel probe 300c reach the tanker aircraft 300 the fuel probe 300c is drawn (by the hose drum unit) back into the nose of the tanker aircraft 300 so as to be reattached thereto. That is, the fuel hose 300b is moved (retracted) relative to the tanker aircraft 300. As the fuel probe 300c is drawn into the nose of the tanker aircraft 300 the self-actuating mechanical clamps or electromagnetic devices are released to decouple the drogue 202b from the fuel probe 300c. In this condition the cable 202a is extended the full distance between the receiver aircraft 100 and the tanker aircraft 300, as shown in FIG. 6g. The two aircraft 100, 300 remain in formation.

Figure 6H:
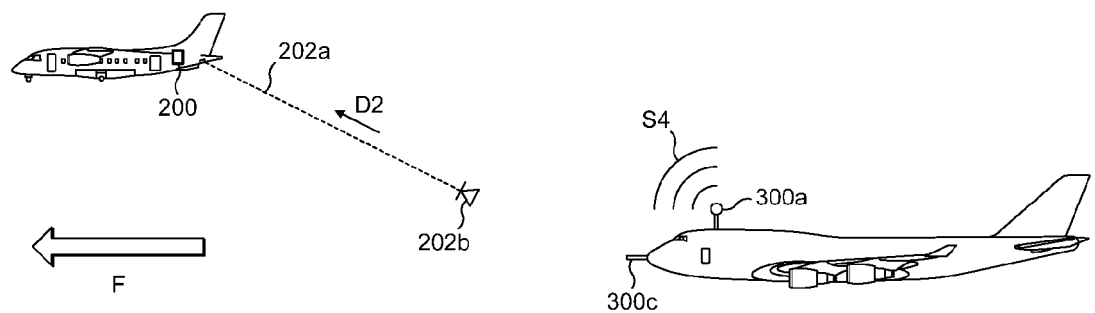

Referring now to FIG. 6h, a fourth command signal S4 is sent by the communication unit 300a of the tanker aircraft 300. The fourth command signal S4 is received by the communication unit 204a of the fuelling module 200 and is processed by the control unit 204b thereof. In response to the fourth command signal S4 the control unit 204b controls (i.e. reverses) the cable drum unit 202, via the control link 204c, to retract the cable 202a and drogue 202b back toward the receiver aircraft 100 in the second direction D2. The cable 202a is wound on the drum in low gear initially. The tensile (pulling) force on the cable 202a causes the drogue 202b to pass forwardly along the fixed fuel probe 300c so as to separate from the fuel probe 300c. In this separated condition the tanker aircraft 300 is untethered from the receiver aircraft 100 and is free to break formation. The cable 202a is wound on the drum in high gear to draw the drogue 202b toward the receiver aircraft 100. Low gear is then used again for fine control as the drogue 202b approaches the receiver aircraft 100. The cable 202a is fully retracted so that the cable 202a and drogue 202b are stored in the housing 201 of the fuelling module 200. During retraction of the cable 202a and drogue 202b the receiver aircraft 100 preferably remains at constant speed in straight and level flight in the forward direction F.

Figure 8:
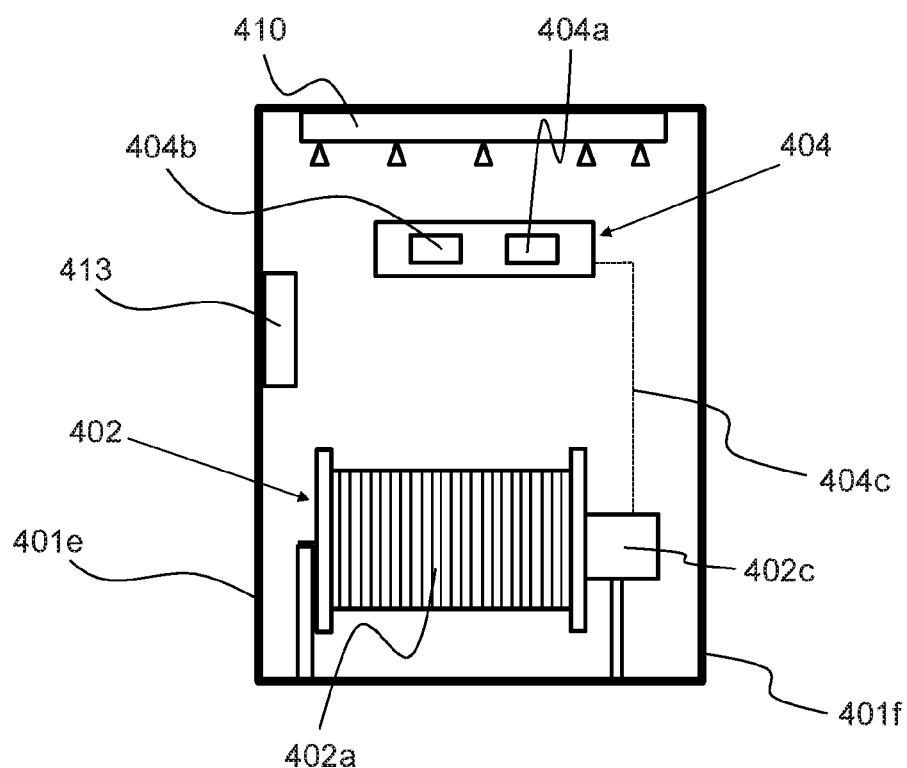
Figure 9:
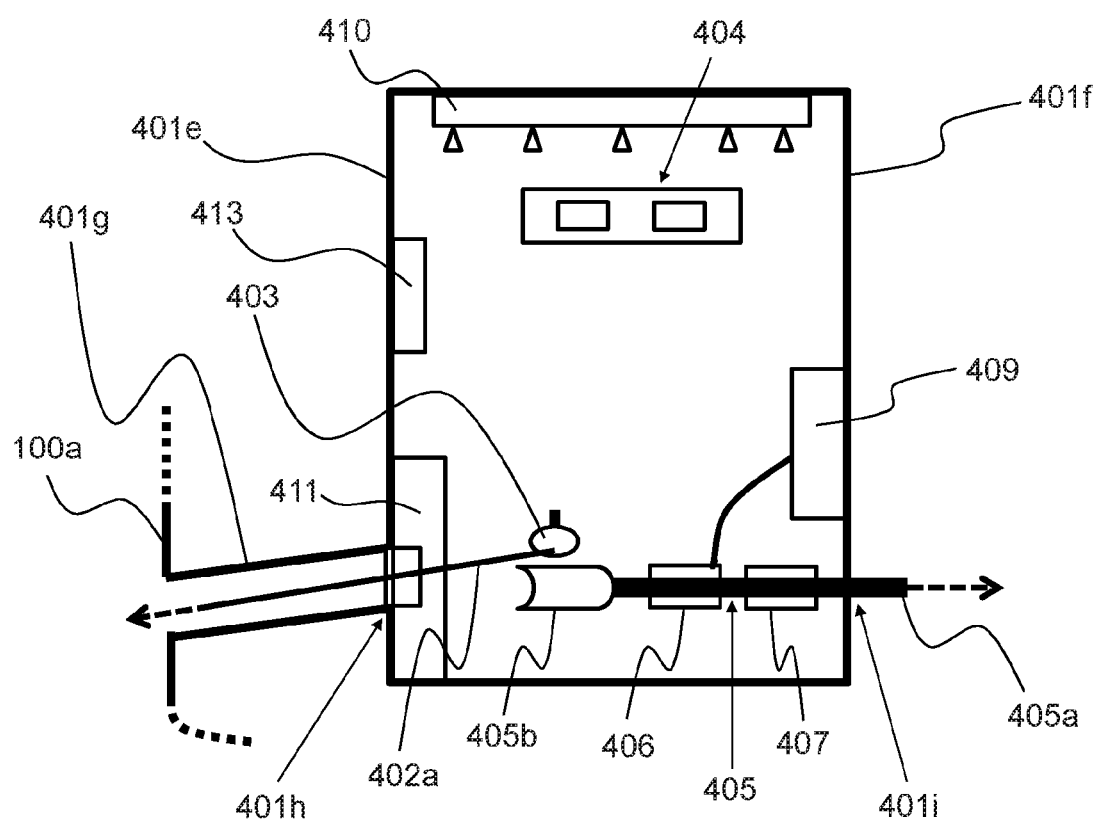

In another example, a propellant-handling module is configured for use with electricity as the propellant, rather than liquid fuel. Referring to FIGS. 7 to 9, the electrical charging module 400 operates on the same general principles as the above-described fuelling module 200 and shares many of its components, but differs in that the electrical charging module 400 comprises: an electrical cable 405 in place of the fuel pipe 205; an electrical inlet socket 405b in place of the fuel inlet port 205b, the electrical inlet socket 405b being configured to receive an electrical cable of an electricity-supply aircraft rather than the fuel hose of a fuel tanker aircraft; an electrical outlet socket 405a in place of the fuel outlet port 205a, the electrical outlet socket 405a being configured to connect to an electrical system (e.g. a battery-charging system) of the receiver aircraft, rather than a fuel system thereof; a voltage transformer 406 in place of the fuel pump 206; and a power wattmeter or ammeter 407 in place of the turbine flow meter 207.

It will be understood that with regard to the electrical variant, the electricity-supply aircraft comprises a means of supply of electricity, for example a generator or batteries.

Also the fuel vapour detection system 208 of the fuelling module 200 is omitted from the electrical charging module 400, due to redundancy.

Also in the electrical variant, the cutter, for severing the electrical cable, is highly electrically insulated.

The electrical variant may comprise an electromagnetic device for guiding and securing the electrical cable to the electrical inlet socket 405b, in the manner described herein above with respect to the liquid fuel variant.

Another example of the electrical variant utilises induction or inductive charging. This removes the need for a direct connection or coupling between a plug and socket, which can be a complex manoeuvre. In this example, the charging is via sealed inductive coils in both the probe end of the power supply cable and a receiving receptacle (or connection) of the module on-board the receiver aircraft. Close proximity is sufficient for charging to take place and resonant coupling can be used to optimise the rate of power transfer. The key advantages of this method are the avoidance of the indirect or autonomous manoeuvring of a plug device into close contact with a socket device, and safety, as the interaction between the two induction coils minimises any risk of sparks or other risk that could give rise to a source of ignition. In addition, because the charging can take place through proximity, the charging could take place through the outer skin of the aircraft, minimising structural changes and keeping the activity external to the aircraft, thus maximising its integrity.

In another example, a propellant-handling module is configured for use with both liquid fuel and electricity as propellants. That is, the propellant-handling module comprises components of each of the above-described fuelling module and the electrical charging module (whether direct charging or inductive charging). Thus the propellant-handling module is suitable for use in a hybrid receiver aircraft which is powered in flight by both of liquid fuel and electrical energy. In such an example, the propellant-handling module is configured for use with a dual supply line of the supply aircraft, i.e. a supply line which conveys both liquid fuel and electrical energy to the module. Alternatively the module can be used with separate supply lines of the supply aircraft, one of which conveys liquid fuel and the other of which conveys electrical energy.

It will be understood that the invention has been described in relation to preferred examples and may be modified in many different ways without departing from the scope of the invention as defined by the accompanying claims.

While in the above-described examples the propellant-handling module comprises a housing which includes an extension tunnel, it will be understood that the extension tunnel may not be required in the case that the propellant-handling module can be installed in the receiver aircraft in such a location that the propellant outlet is proximate to the fuselage skin of the aircraft. In such an example the extension tunnel may be omitted, or at least shortened. Also the extension tunnel may be provided as a separate and distinct part, which is configured to be attached to the main housing of the propellant-handling module. Furthermore, the entire housing of the propellant-handling module is merely optional and in an example the housing is omitted. In such an example the various components of the propellant-handling module may be mounted on a suitable common platform or frame which can be installed in the receiver aircraft.

The propellant-handling module housing may be a modified aircraft unit load device (ULD).

In an example, the housing is constructed from a fire resistant as well as structurally robust material, so that the housing can resist changes in pressure, drag on the cable when hauling back the fuel hose or electrical cable (both on the motorised drum and any associated pulley systems), and high temperatures with regard to fire. In the event of a fire breaking out in the module, the construction of the housing isolates the host aircraft from the fire, allowing the fire suppression system to smother the fire, thereby reducing safety risk. Other safety features may include isolation and double insulation of all electrical components, and fire/smoke alarms.

The housing may be made fire and/or explosion resistant by any appropriate means, for example using materials and methods applied in conventional unit load devices (ULDs) for aircraft. Examples of construction materials for the housing include, but are not limited to, fire-resistant metals or metal alloys (e.g. stainless steel, molybdenum, tungsten, titanium), fibre-reinforced plastics (e.g. MACROLite®) and/or polymer-coated fire-retardant fabric coverings (e.g. AmSafe®, Z-Block®). The construction of the housing may include any combination of such materials.

While in the above-described examples the communication unit and the control unit of the propellant-handling module are located along with the other components of the module, for example in the housing, in another example one or both of the communication unit and the control unit are located in the receiver aircraft, externally and remotely of the module. In such an example, the communication and control system of the propellant-handling module comprises a suitable communication and control interface which can be connected to the external and remote communication unit and control unit.

While in the above-described examples the electrical power unit of the propellant-handling module comprises an electrical interface for receiving electrical power from the receiver aircraft, in another example the propellant-handling module comprises an integral electrical power unit, for example comprising one or more batteries, for providing electrical power to the propellant-handling module independently of the receiver aircraft.

Various kinds of line other than a cable are envisaged for use with the drogue, for example wire, cord, rope, chain, or the like, and all of these are within the scope of the claimed invention.

The structure of the drogue may be made collapsible for convenient and compact storage in the housing (preferably in the extension tunnel, where present), of the propellant-handling module. The drogue may comprise adjustable aerodynamic control surfaces for guiding the drogue for engagement with the first end of the fuel hose in flight. The drogue may further comprise a communication unit for receiving control signals from the communication unit of the tanker aircraft for adjusting the aerodynamic control surfaces. The drogue may further comprise a dedicated electrical power source for powering the adjustable aerodynamic control surfaces. The cable of the motorised cable drum unit may comprise a conductive material for transmitting electrical power from the receiver aircraft to the drogue for powering the adjustable aerodynamic control surfaces. Control instructions may be sent (e.g. wirelessly) from the communication and control system to the receiver aircraft, and then to the drogue via the cable.

While in the above-described examples the propellant-handling module comprises a pulley for directing the cable toward the opening in the fuselage of the receiver aircraft, in other examples the pulley may be omitted, for example if the cable drum unit and fuselage opening are arranged such that the cable can be deployed along the longitudinal axis of the aircraft and the extension tunnel (if present).

In an example, the cable drum unit is configured to be articulated so that it can be disposed in any orientation relative to the direction of travel of the receiver aircraft.

In an example, the propellant-handling module comprises a CCTV system and optic fibre lighting, to enable the tanker crew to visually confirm and monitor the connection of the fuel hose or electrical cable to the fuel inlet port or electrical inlet socket.

While in the above-described examples a switchable electromagnetic device actively provides a magnetic attractive force for guiding (and holding) the propellant supply line to the propellant inlet, in another example the propellant inlet instead comprises a magnetic element (a permanent magnet or a magnetic material) which is complemented by a magnetic element of the propellant supply line so as to provide a passive magnetic attractive force for the same purpose. In this example, the action of the cable pulling on the propellant supply line overcomes the attractive force and thereby causes the propellant supply line to disengage from the propellant inlet.

In an example, the cable drum unit is mounted on rails, or the like, so as to be movable (e.g. using a motor) relative to the housing (or other platform) of the module. Thus the cable drum unit can be translated toward or away from the supply aircraft in flight. This provides an alternative means of managing the tension in the supply line of the supply aircraft while the supply line is connected to the propellant inlet. In this example the cable drum unit comprises a short, flexible (or telescopic) supply line to allow translational movement of the cable drum unit.

While in the above-described examples the drogue is fixedly coupled to the fuel probe (or electrical cable) of the supply aircraft by means of self-actuating mechanical clamps or electromagnetic devices, it will be understood that various other means of coupling or connection will be suitable. All of these means are within the scope of the claimed invention, provided that they enable the drogue to engage with the fuel probe/end of the fuel hose (or electrical cable) such that the fuel hose (or electrical cable) will be drawn out of (moved relative to) the supply aircraft, toward the receiver aircraft, when the line and drogue are retracted using the motorised drum unit.

The invention offers numerous benefits, as follows:

1. Rapid installation, meaning that aircraft are out of operation for a shorter time during installation and testing, encouraging speedy adoption and saving costs for operators.

2. Economies of scale in costs of the equipment and its installation through standardisation of modules.

3. Standardisation of modules driving faster testing and quicker and broader safety certification.

4. Scale and speedier adoption drives faster learning and adaptation improvements.

5. Standardisation of modules also drives standards in interfaces to the modules.

6. Integration of safety features in self-contained modules minimises operating risks.

7. Standardisation of modules minimises training required by tanker crews and installation and servicing staff.

While the invention has been described generally in the context of civil or commercial aircraft operations, it will be understood that the invention is applicable to aircraft of various types in both civil and military contexts. For example, the invention may be used in connection with fixed-wing and rotary wing aircraft (e.g. helicopters) and manned and unmanned aircraft (e.g. drones).

The invention claimed is:

1. A propellant-handling module for installation in a host aircraft, comprising:
    a motorised drum unit comprising a line and drogue for engagement with a propellant supply line of a propellant supply aircraft and for drawing the propellant supply line from the propellant supply aircraft to the host aircraft when the propellant supply aircraft is located behind the host aircraft;
    a propellant inlet configured for connection with the propellant supply line;
    a propellant outlet in communication with the propellant inlet and configured for connection with a propellant system of the host aircraft;
    an electrical power unit for powering the propellant-handling module; and
    a communication and control system for receiving a deploy command signal and a return command signal from the propellant supply aircraft and configured to:
        receive said deploy command signal and in response control the motorised drum unit to deploy the line and drogue for said engagement with the propellant supply line; and
        receive said return command signal and in response control the motorised drum unit to return the line and drogue to the host aircraft in said engagement with the propellant supply line for drawing the propellant supply line from the propellant supply aircraft to the host aircraft when the propellant supply aircraft is located behind the host aircraft, such that the line and drogue are returned and the propellant supply line is deployed by simultaneous actions of the motorised drum unit and a propellant supply line drum unit on the propellant supply aircraft.

2. The propellant-handling module of claim 1, wherein the communication and control system comprises an integral communication unit having a circuit that is configured to receive the command signals sent by the propellant supply aircraft.

3. The propellant-handling module of claim 1, wherein the communication and control system comprises a communication interface having a circuit that is configured to:
    connect with a remote communication unit which is located on-board the host aircraft externally of the propellant-handling module; and
    receive the command signals sent by the propellant supply aircraft.

4. The propellant-handling module of claim 1, wherein the communication and control system comprises an integral control unit having a circuit that is configured to provide the control of the motorised drum unit.

5. The propellant-handling module of claim 1, wherein the communication and control system comprises a control interface having a circuit configured to:
    connect with a remote control unit which is located on-board the host aircraft externally of the propellant-handling module; and
    provide the control of the motorised drum unit.

6. The propellant-handling module of claim 1, wherein the electrical power unit comprises an integral electrical power source.

7. The propellant-handling module of claim 1, wherein the electrical power unit comprises an electrical power interface having a circuit configured to connect with an external electrical power source of the host aircraft.

8. The propellant-handling module of claim 1, wherein the communication and control system comprises a communication interface having a circuit configured to connect with a flight management system of the host aircraft.

9. The propellant-handling module of claim 1, comprising a housing which contains the motorised drum unit, the propellant inlet, the propellant outlet, the electrical power unit, and the communication and control system.

10. The propellant-handling module of claim 9, wherein the housing comprises a main part and an extension part, the extension part being for providing a connecting passageway between the propellant-handling module and an exterior surface of the host aircraft when the propellant-handling module is installed in the host aircraft.

11. The propellant-handling module of claim 9, wherein the main part of the housing has the size and shape of a standard aircraft unit load device.

12. The propellant-handling module of claim 1, the propellant being a liquid fuel and the propellant supply line being a fuel hose of the propellant supply aircraft, wherein:
    the propellant inlet comprises a fuel inlet port configured for connection with the fuel hose; and
    the propellant outlet comprises a fuel outlet port in fluidic communication with the fuel inlet port and configured for connection with a fuel system of the host aircraft.

13. The propellant-handling module of claim 12, comprising at least one fuel pump configured to pump fuel from the fuel inlet port to the fuel outlet port.

14. The propellant-handling module of claim 12, comprising an inerting system including a supply of inert gas for venting fuel vapour from the propellant-handling module.

15. The propellant-handling module of claim 1, wherein:
the propellant supply line is an electrical cable of the propellant supply aircraft and a propellant supplied by the propellant supply line is electrical energy;
the propellant inlet comprises an electrical inlet connection configured for direct or inductive coupling with the electrical cable; and
the propellant outlet comprises an electrical outlet socket in electrical communication with the electrical inlet connection and configured for connection with an electrical system of the host aircraft.

16. The propellant-handling module of claim 1, comprising a measuring device configured to measure a propellant transferred between the propellant inlet and the propellant outlet.

17. The propellant-handling module of claim 1, comprising a fire suppression system including a supply of fire suppressant chemicals for, when the propellant-handling module is installed in the host aircraft, suppressing a fire in the propellant-handling module.

18. The propellant-handling module of claim 1, comprising a cutter for, when the propellant-handling module is installed in the host aircraft, severing the propellant supply line so as to separate the propellant supply line from the propellant-handling module.

19. The propellant-handling module of claim 1, wherein the propellant inlet comprises an electromagnetic device controllable by the communication and control system to provide an attractive magnetic force for guiding the propellant supply line to the propellant inlet.

20. An aircraft comprising:
a propellant-handling module comprising:
a motorised drum unit comprising a line and drogue for engagement with a propellant supply line of a propellant supply aircraft and for drawing the propellant supply line from the propellant supply aircraft to the aircraft when the propellant supply aircraft is located behind the aircraft;
a propellant inlet configured for connection with the propellant supply line;
a propellant outlet in communication with the propellant inlet and configured for connection with a propellant system of the aircraft;
an electrical power unit for powering the propellant-handling module; and
a communication and control system for receiving a deploy command signal and a return command signal from the propellant supply aircraft and configured to:
receive said deploy command signal and in response control the motorised drum unit to deploy the line and drogue for said engagement with the propellant supply line; and
receive said return command signal and in response control the motorised drum unit to return the line and drogue to the aircraft in said engagement with the propellant supply line for drawing the propellant supply line from the propellant supply aircraft to the aircraft when the propellant supply aircraft is located behind the aircraft, such that the line and drogue are returned and the propellant supply line is deployed by simultaneous actions of the motorised drum unit and a propellant supply line drum unit on the propellant supply aircraft.

* * * * *